(12) United States Patent
Tanikawa et al.

(10) Patent No.: US 6,515,950 B1
(45) Date of Patent: Feb. 4, 2003

(54) INFORMATION RECORDING MEDIUM, AND METHOD AND SYSTEM FOR READING AND WRITING INFORMATION THEREON

(75) Inventors: Toshiro Tanikawa, Saitama-ken (JP); Hidehiro Ishii, Saitama-ken (JP); Tadashi Noguchi, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 297 days.

(21) Appl. No.: 09/676,784

(22) Filed: Oct. 2, 2000

(30) Foreign Application Priority Data

Oct. 4, 1999 (JP) ............................. 11-283376

(51) Int. Cl.$^7$ ................................. G11B 5/09
(52) U.S. Cl. ............................... 369/53.24; 369/47.13; 369/53.21; 369/30.07
(58) Field of Search ................... 369/30.05, 30.07, 369/47.12, 47.13, 53.21, 53.24, 30.19; 360/57, 69, 72.1; 386/56

(56) References Cited

U.S. PATENT DOCUMENTS

| | | | | |
|---|---|---|---|---|
| 5,107,481 A | * | 4/1992 | Miki et al. | 369/53.24 |
| 5,422,871 A | * | 6/1995 | Nakashima et al. | 369/47.13 |
| 5,774,434 A | * | 6/1998 | Arataki et al. | 369/30.07 |
| 5,907,446 A | * | 5/1999 | Ishii et al. | 360/69 |
| 6,204,985 B1 | * | 3/2001 | Ono et al. | 360/69 |
| 6,256,453 B1 | * | 7/2001 | Takano | 369/53.24 |

* cited by examiner

Primary Examiner—Thang V. Tran
(74) Attorney, Agent, or Firm—Arent Fox Kintner Plotkin Kahn

(57) ABSTRACT

There are provided an information recording medium, and a method and system for reading and writing information thereon, which make it possible to facilitate recording by rewriting in use of the rewritable DVD repeatedly by rewriting. When one piece of or a plurality of pieces of program data VRO having already been recorded in a real-time data recording area A3 is reproduced, history management information indicating that the program data has been reproduced is recorded in a predetermined management information recording area A2 of the rewritable DVD, corresponding to the aforementioned one piece of or the aforementioned plurality of pieces of the program information. Moreover, when other program data is recorded, the other program data is adapted to overwrite automatically the program data VRO, having been already recorded, corresponding to the history management information recorded in the management information recording area A2.

12 Claims, 8 Drawing Sheets

FIG. 3

| MANAGEMENT INFORMATION | OBJECT INFORMATION TABLE (VOBI_TABLE) |
|---|---|
| | PROGRAM CHAIN INFORMATION (PGCI) |

FIG. 4

| OBJECT INFORMATION TABLE (VOBI_TABLE) | OBJECT INFORMATION TABLE INFORMATION (VOBI TABLE INFORMATION) | OBJECT INFORMATION NUMBER (VOBI INFORMATION NUMBER) |
|---|---|---|
| | OBJECT INFORMATION (VOBI_#1) | CELL START NUMBER (CSRLBN) |
| | | CELL END NUMBER (CSRLBN) |
| | | PROTECT INFORMATION (PRTI) |
| | OBJECT INFORMATION (VOBI_#2) | CELL START NUMBER (CSRLBN) |
| | | CELL END NUMBER (CSRLBN) |
| | | PROTECT INFORMATION (PRTI) |
| | OBJECT INFORMATION (VOBI_#3) | CELL START NUMBER (CSRLBN) |
| | | CELL END NUMBER (CSRLBN) |
| | | PROTECT INFORMATION (PRTI) |
| | ⋮ | |
| | OBJECT INFORMATION (VOBI_#n) | CELL START NUMBER (CSRLBN) |
| | | CELL END NUMBER (CSRLBN) |
| | | PROTECT INFORMATION (PRTI) |

FIG. 5

| MANAGEMENT INFORMATION (PGCI) | PROGRAM CHAIN INFORMATION (PCI) | GENERAL INFORMATION (GI) | PROGRAM INFORMATION NUMBER (PIN) | |
|---|---|---|---|---|
| | | PROGRAM INFORMATION (PI_#1) | START CELL NUMBER (SCN) | |
| | | | END CELL NUMBER (ECN) | |
| | | PROGRAM INFORMATION (PI_#2) | START CELL NUMBER (SCN) | |
| | | | END CELL NUMBER (ECN) | |
| | | . . . | | |
| | | PROGRAM INFORMATION (PI_#n) | START CELL NUMBER (SCN) | |
| | | | END CELL NUMBER (ECN) | |
| | CELL INFORMATION (CELLI_#1) | CELL GENERAL INFORMATION (CGI) | | OBJECT INFORMATION SEARCH POINTER (VOBISP) |
| | | | | RECORDING TIME (RT) [YEAR/MONTH/DAY/HOUR/MINUTE/SECOND] |
| | | | | READ TIME (PBT) [YEAR/MONTH/DAY/HOUR/MINUTE/SECOND] |
| | | CELL ENTRY POINT INFORMATION (CEPI_#1) | | |
| | | . . . | | |
| | | CELL ENTRY POINT INFORMATION (CEPI_#n) | | |
| | . . . | | | |
| | CELL INFORMATION (CELLI_#n) | CELL GENERAL INFORMATION (CGI) | | OBJECT INFORMATION SEARCH POINTER (VOBISP) |
| | | | | RECORDING TIME (RT) [YEAR/MONTH/DAY/HOUR/MINUTE/SECOND] |
| | | | | READ TIME (PBT) [YEAR/MONTH/DAY/HOUR/MINUTE/SECOND] |
| | | CELL ENTRY POINT INFORMATION (CEPI_#1) | | |
| | | . . . | | |
| | | CELL ENTRY POINT INFORMATION (CEPI_#n) | | |

INFORMATION RECORDING MEDIUM, AND METHOD AND SYSTEM FOR READING AND WRITING INFORMATION THEREON

BACKGROUND OF THE INVENTION

The present invention relates to an information recording medium for enabling information to be reproduced and recorded thereon, a method for reading and writing information on the information recording medium, and an information read/write system.

VTRs (Video Tape Recorders) have become widespread as an information read/write system which enables information to be reproduced and recorded thereon. The VTR is for reading and writing information on a magnetic tape employed as an information recording medium. Thus, the property of the magnetic tape has made it impossible for users to access randomly or search quickly the information desired by the users.

To solve such problems of the VTR as mentioned above, information recording media of disc type such as CDs (Compact Disc) or DVDs (Digital Video Disc OR Digital Versatile Disc) have been developed. In addition, rewritable DVDs have received attention as an information recording medium of the next generation. The rewritable DVD not only allows reading and writing information thereon but also allows re-recording new information by erasing the information previously recorded thereon.

However, for example, consider a case where the information which has been already recorded on the information recording area in the aforementioned rewritable DVD is overwritten with other information. In this case, it was necessary for the user to have the recorded information read, then check and determine whether the recorded information can be overwritten, and then specify an information recording area which can be overwritten.

Thus, this raised such a problem that the aforementioned complicated procedures had to be repeated every time the rewritable DVD was used by rewriting the rewritable DVD.

SUMMARY OF THE INVENTION

The present invention was developed in view of the aforementioned problems. An object of the present invention is to provide an information recording medium, and a method and system for reading and writing information thereon, which makes it possible to facilitate recording by rewriting.

An information recording medium, and a method and system for reading and writing information thereon according to the present invention are adapted as follows to achieve the aforementioned object. That is, when one piece of or a plurality of pieces of program information having already been recorded is reproduced, history management information indicating that the program information has been reproduced is recorded in a predetermined management information recording area of the information recording medium, corresponding to the aforementioned one piece of or the aforementioned plurality of pieces of the program information. In addition, when other program information is recorded, the aforementioned other program information overwrites the program information, having been already recorded, corresponding to the aforementioned history management information.

According to the present invention, when other program information is recorded, the other program information overwrites automatically the program data which may be overwritten. Accordingly, without being bothered by complicated operation, the user is allowed to erase unnecessary program data to record other program information.

In addition, when the aforementioned other program information is recorded, the aforementioned other program information is adapted to overwrite the program information having been already recorded, and reproduced at the earliest time, corresponding to the aforementioned history management information.

According to the present invention, program data which are unnecessary for the user is overwritten in chronological order. This enables the user to erase unnecessary program data without being bothered by complicated operation to record other program information.

Furthermore, protect management information indicating a setting of disabling erasing of the aforementioned program information is recorded in the aforementioned management information recording area, and when the aforementioned other program information is recorded, the aforementioned other program information is not allowed to overwrite the program information corresponding to the protect management information indicating the aforementioned setting of disabling erasing.

According to the present invention, the program information is excluded from overwriting even if the program information has been reproduced and if the program information is under the control of the protect management information.

This makes it possible to prevent such a problem as to accidentally erase the program information which is desired to remain unerased by the user.

BRIEF DESCRIPTION OF THE DRAWINGS

The present invention, together with objects and advantages thereof, may best be understood by reference to the following description of the presently preferred embodiments together with the accompanying drawings in which:

FIG. 3 is an explanatory view illustrating the file structure of a management information to be recorded on the DVD-RW according to an embodiment of the present invention.

FIG. 4 is an explanatory view illustrating the file structure of an object information table to be recorded on the DVD-RW according to an embodiment of the present invention.

FIG. 5 is an explanatory view illustrating the file structure of a program chain information to be recorded on the DVD-RW according to an embodiment of the present invention.

DETAILED DESCRIPTION OF THE PREFERRED EMBODIMENTS

The embodiments of the present invention will be explained below with reference to the accompanying drawings. Incidentally, the embodiments will be explained with a rewritable DVD (hereinafter referred to as the "DVD-RW") employed as an information recording medium. In addition, a method and system for reading and writing information will be explained which employ the DVD-RW.

Figure 1:
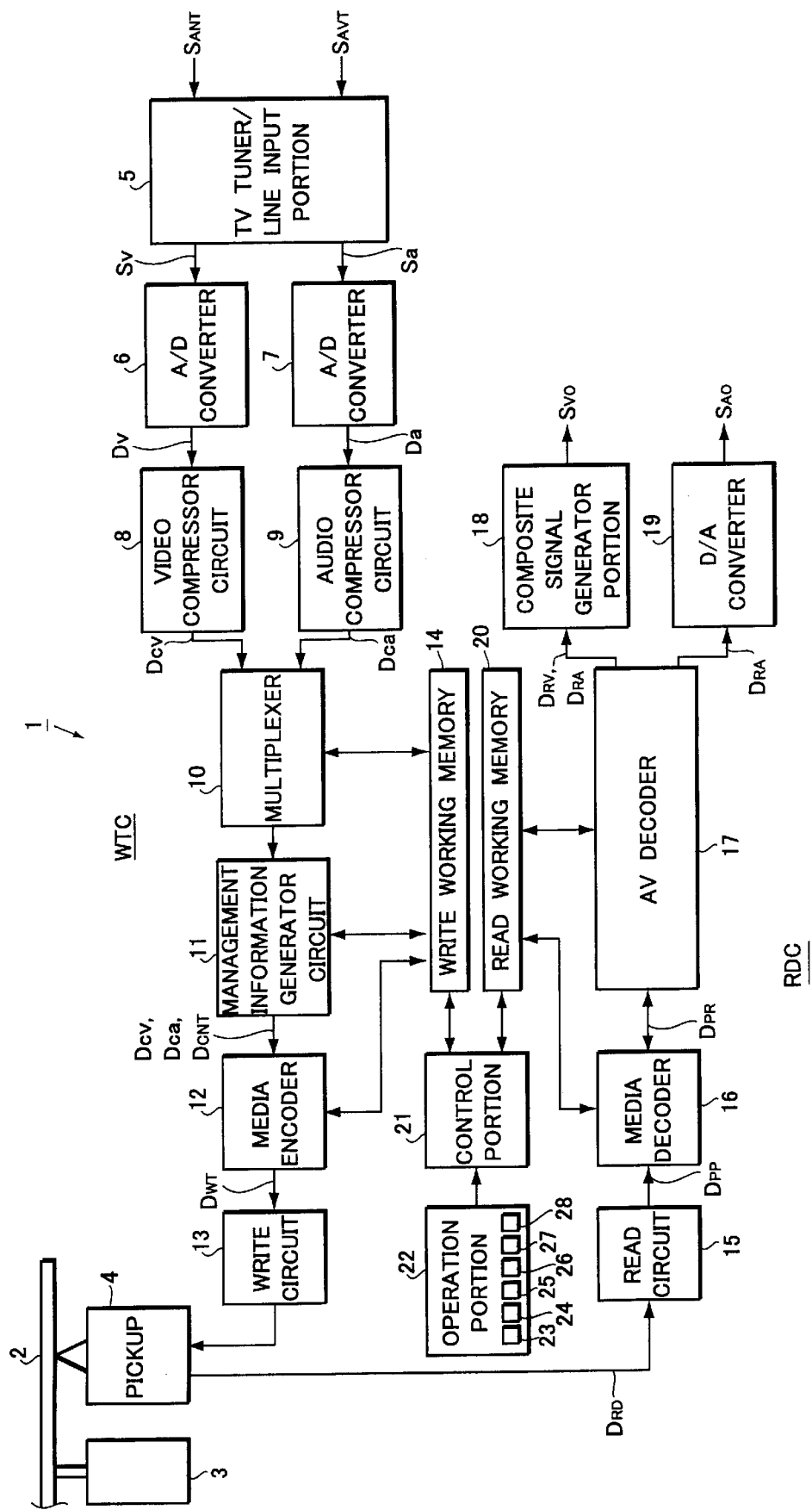
FIG. 1 is a block diagram illustrating the configuration of an information read/write system according to an embodiment of the present invention.
Figure 2:
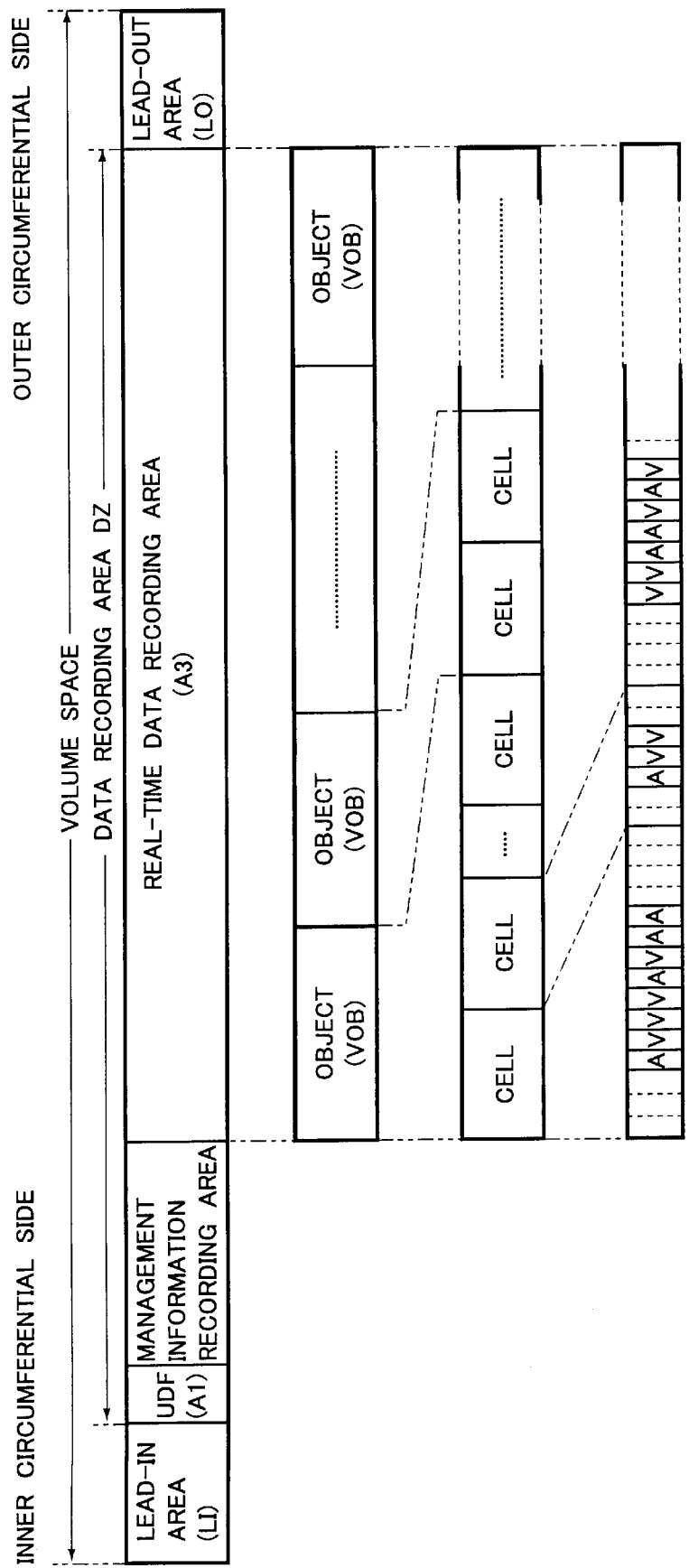
FIG. 2 is an explanatory view illustrating the data structure of a DVD-RW according to an embodiment of the present invention.
Figure 6:
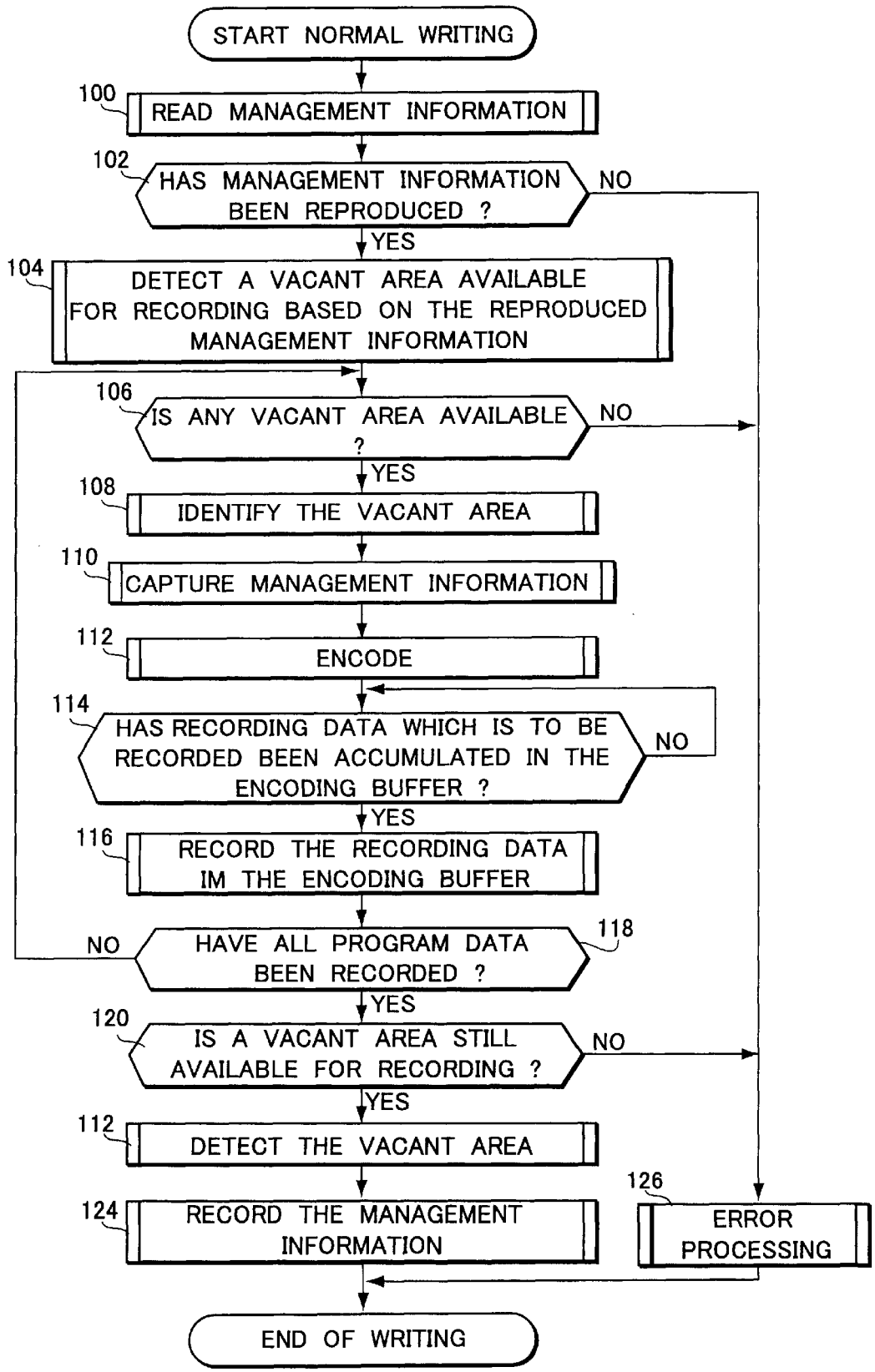
FIG. 6 is a flowchart for explaining a normal writing operation of an information read/write system according to an embodiment of the present invention.
Figure 7:
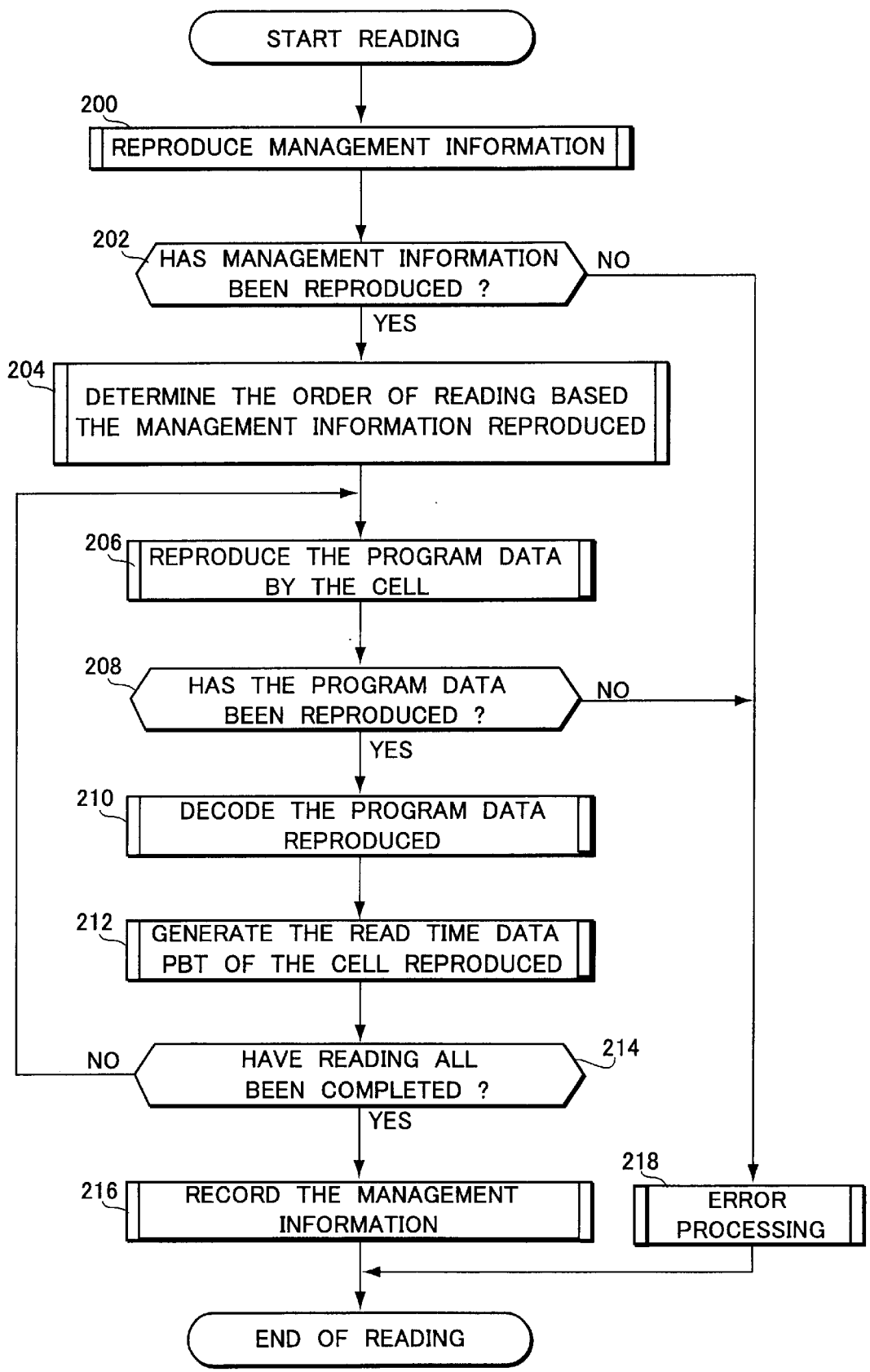
FIG. 7 is a flowchart for explaining a reading operation of an information read/write system according to an embodiment of the present invention.
Figure 8:
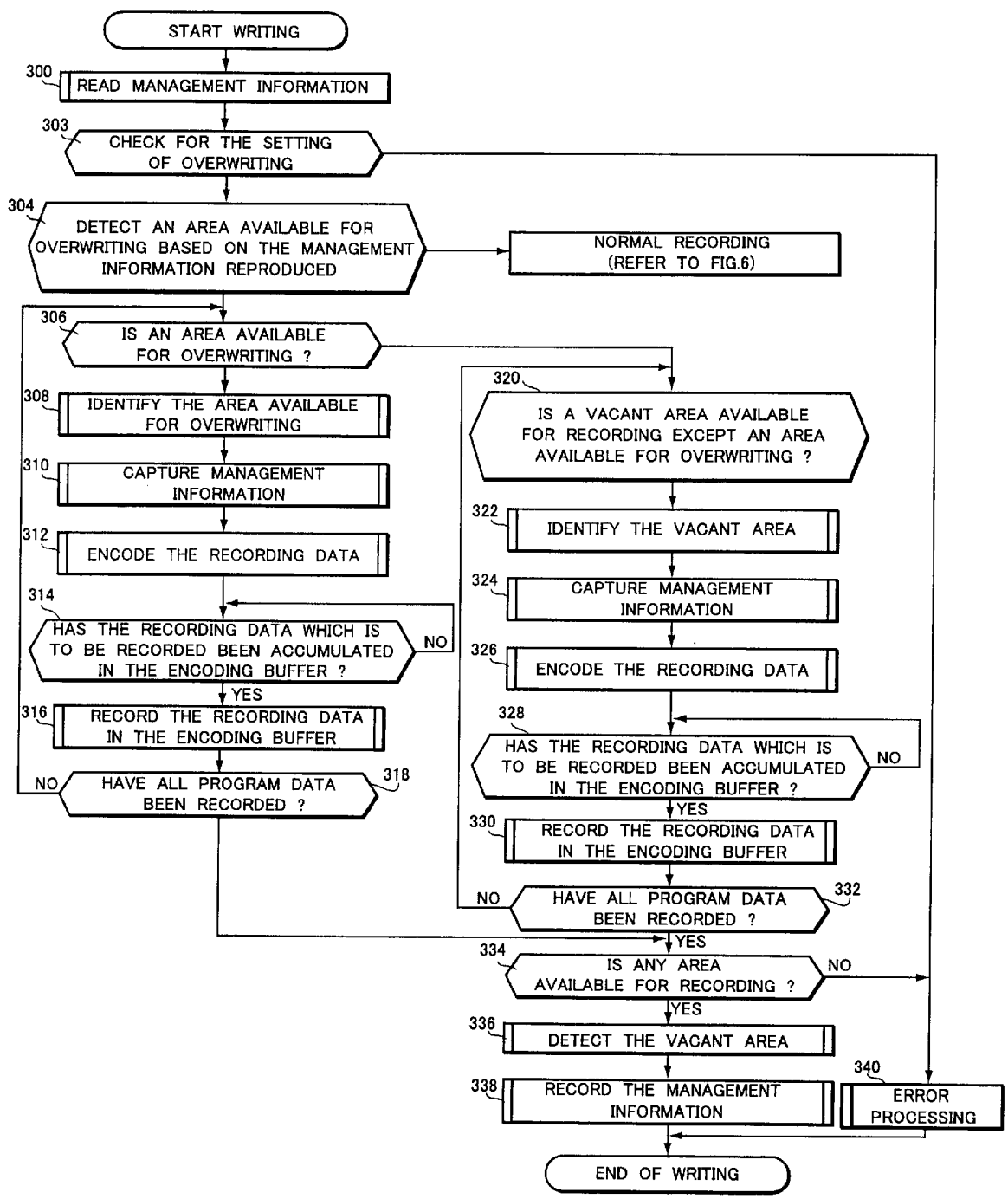
FIG. 8 is a flowchart for explaining an overwriting operation of an information read/write system according to an embodiment of the present invention.

FIG. 1 is a block diagram illustrating the configuration of an information read/write system according to this embodiment. FIG. 2 is an explanatory schematic view illustrating the data structure of the DVD-RW. FIGS. 3 to 5 are explanatory views illustrating the file structure of the management information and the like. FIGS. 6 to 8 are explanatory flow charts showing the operation of the information read/write system and the method for reading and writing information.

Referring to FIG. 2, the DVD-RW is an optical disc which enables reading and writing information thereon, and erasing the information which has been already recorded and re-writing new information thereon. The volume space of the DVD-RW is made up of a lead-in area LI assigned to a recording track on the inner circumferential side, a lead-out area LO assigned to the recording track on the outer circumferential side, and a data recording area DZ assigned to the recording tracks therebetween.

The data recording area DZ is made up of a UDF (Universal Disc Format) recording area A1, a management information recording area A2, and a real-time data recording area A3. Here, a micro UDF as a logical format for showing the relationship between the physical address and logical address of a recording track is recorded on the UDF recording area A1.

On the real-time data recording area A3, so called program data VRO such as audio or video data desired by users are recorded, while management information VMG for managing the program data VRO is recorded on the management information recording area A2.

It is made possible to record not only one content but also a plurality of contents as individual program data VRO on the real-time data recording area A3. For example, when recording television broadcasting, users are allowed to record a plurality of television programs (i.e., a plurality of contents) as individual program data VRO. In addition, each individual program data VRO is controlled with the management information VMG, thereby making it possible to read or edit the program data VRO which is specified by users.

To enable reading and editing the program data VRO of such plurality of contents, the respective program data VRO are divided into logical units in accordance with a predetermined hierarchical algorithm, each of the logical units being controlled with the management information VMG.

That is, the program data VRO of the respective contents is managed as a recording unit which is called an object VOB, each of which is in turn managed as one or a set of a plurality of cells. Moreover, the most physical data of the program data VRO such as audio and video data are associated logically with the individual cells as a set of a predetermined number of words of audio pack data A or video pack data V.

For example, to record the aforementioned television broadcasting, respective programs (contents) are file-controlled as an object VOB, each of which is in turn file-controlled as one or a set of a plurality of cells. Then, the management information VMG for file-managing these objects VOB and cells by relating to each other is recorded on the management information recording area A2.

Thus, the logical unit such as the object VOB, the cell, and the audio pack data A or the video pack data V organizes hierarchically the program data VRO of respective contents in a logical manner. This allows edition by the object, the cell, the audio pack data A, or the video pack data V as a unit.

In addition, at the time of recording, the order of recording respective logical units is included in the management information VMG and recorded in the management information recording area A2. Reading is carried out in accordance with the order of recording, thereby making it possible to surely read the program data VRO for each of the contents.

Next, the file structure of the management information VMG to be recorded on the management information recording area A2 will be explained with reference to FIGS. 3 to 5.

As shown in FIG. 3, the management information VMG is largely divided into program chain information PGCI and object information table VOBI_Table. The file structure of the object information table VOBI_Table is shown in FIG. 4, while that of the program chain information PGCI is shown in FIG. 5.

Referring to FIG. 4, the object information table VOBI_Table comprises object information table information (VOBI table information) and object information (VOB information) VOBI_#1–VOBI_#n.

Moreover, as the aforementioned object information table information, data is recorded which is called an object information number (VOB information number) for indicating the total number of the object information VOBI_#1–VOBI_#n.

Associated with each of the aforementioned program data VRO is each object information VOBI_#1–VOBI_#n, which comprises a cell start number CSRLBN for indicating the first cell in each program data VRO, a cell end number CERLBN for indicating the last cell therein, and protect information data PRTI for specifying whether erasing those cells is either disabled or enabled.

Referring to FIG. 5, the program chain information PGCI is for editing and reading each program data VRO by the aforementioned individual unit, comprising general information GI, program information PI_#1–PI_#m each of which is provided with an identifier #m to discriminate from one another, and cell information CELLI_#1–CELLI_#n each of which is provided with an identifier #n to discriminate from one another.

Here, as the general information GI, included is a program information number PIN for indicating a logical address with the program information PI_#1–PI_#m recorded therein.

Each of the program information PI_#1–PI_#m comprises a start cell number SCN of the cell to be read at the start of reading and an end cell number ECN of the cell to be read at the end of the reading, among one or a plurality of cells corresponding to the individual program data VRO.

Each of the cell information CELLI_#1–CELLI_#n comprises cell general information CGI and a plurality of pieces of cell entry point information CEPI_#1–CEPI_#n each of which is provided with an identifier #n to discriminate from one another.

The cell general information CGI is for indicating the attribute of the individual cell, comprising an object information search pointer VOBISP, recording time data RT for indicating the time at which individual cell is recorded (the time at which the recording is completed), and read time data PBT for indicating the time at which individual cell is read (the time at which the reading is completed). That is, all the individual cells are adapted to have the recording time data RT and the read time data PBT.

The cell entry point information CEPI_#1–CEPI_#n indicates the order of reading the individual cells.

Next, the configuration of an information read/write system employing a DVD-RW having such a data structure will be explained with reference to FIG. 1.

Referring to FIG. 1, the information read/write system 1 according to the present invention is provided with a spindle motor 3 for clamping a DVD-RW 2 and then rotating the DVD-RW 2 at a predetermined linear velocity, and a pickup 4 for recording (writing), reproducing (reading), and re-recording (erasing and overwriting) data optically on the DVD-RW 2.

Moreover, the information read/write system 1 is provided with a writing system WTC for writing information onto the DVD-RW 2, a reading system RDC for reading the information recorded on the DVD-RW 2, a control portion 21 for controlling the operation of the entire information read/write system 1, and an operation portion 22 for the user to give desired instructions to the control portion 21.

The operation portion 22 is provided with an operation button switch 23 for the user to enter a command for starting writing, an operation button switch 24 for entering a command for terminating writing, an operation button switch 25 for entering a command for starting reading, an operation button switch 26 for entering a command for terminating reading, as well as a mode selector switch 27 for selectively setting overwriting or releasing the setting of overwriting, and a protect button switch 28 for selectively enabling or disabling the setting of erasing the data which have been recorded.

The writing system WTC comprises a TV tuner/line input portion 5, A/D converters 6, 7, a video compressor circuit 8, an audio compressor circuit 9, a multiplexer 10, a management information generator circuit 11, a media encoder 12, a write circuit 13, and a write working memory 14.

The TV tuner/line input portion 5 receives a television signal SANT via a receiving antenna (not shown) and receives an audio/video signal SAVI inputted from other video and audio devices. Then, the TV tuner/line input portion 5 supplies an analog video signal Sv and an analog audio signal Sa, which are included in the analog television signal SANT received or audio/video signal SAVI inputted, to the A/D converters 6, 7, respectively.

The A/D converter 6 converts the analog video signal Sv to a digital video data Dv, while the A/D converter 7 converts the analog audio signal Sa to a digital audio data Da.

The video compressor circuit 8 performs compression processing on the digital video data Dv in accordance with a standard such as the MPEG2 video format (ISO 13818-2) and then supplies the compressed data (hereinafter referred to as compressed video data) Dcv to the AV multiplexer 10.

The audio compressor circuit 9 performs compression processing on the digital audio data Da in accordance with a standard such as for MPEG audio and then supplies the compressed data (hereinafter referred to as compressed audio data) Dca to the multiplexer 10.

User's entry of a command for starting writing at the operation button switch 23 will cause the multiplexer 10 to multiplex and then output the compressed video data Dcv and the compressed audio data Dca under the control of the control portion 21. That is, the multiplexer 10 time-divides the compressed video data Dcv and the compressed audio data Dca into data by the video pack data V and the audio pack data A to be outputted as shown in FIG. 2.

The management information generator circuit 11 transfers the compressed video data Dcv and the compressed audio data Dca, both being time divided by means of the multiplexer 10, to the media encoder 12. At the same time, the management information generator circuit 11 generates management data DCNT for file-managing the compressed video data Dcv and the compressed audio data Dca, which are then supplied to the media encoder 12, under the control of the control portion 21.

The media encoder 12 performs code error correction processing such as interleaving on the compressed video data Dcv, the compressed audio data Dca, and the management data DCNT, which are supplied from the management information generator circuit 11. The media encoder 12 thereby generates writing data DWT, which is in turn supplied to the write circuit 13.

The write circuit 13 performs power amplification on the writing data DWT supplied from the media encoder 12 and then supplies the data DWT amplified to the pickup 4, thus serving to write information onto the DVD-RW 2.

The write working memory 14 is formed of a semiconductor memory, and is adapted to store temporarily the data Dcv, Dca, and DCNT when the multiplexer 10, the management information generator circuit 11, and the media encoder 12 perform the aforementioned processing.

Incidentally, although detailed later, consider a case where the user enters a command for starting writing at the operation button switch 23 after having entered a command for releasing the setting of overwriting (disabling overwriting) at the mode selector switch 27. In this case, the control portion 21 first controls the reading system RDC to read the management information VMG recorded on the DVD-RW 2 and then checks for a vacant area in the real-time data recording area A3 of the DVD-RW 2 based on the management information VMG. Thereafter, the control portion 21 activates the writing system WTC to write the compressed video data Dcv and the compressed audio data Dca in the writing data DWT onto the vacant area of the real-time data recording area A3. After the recording onto the vacant area has been completed, the control portion 21 writes the management data DCNT in the writing data DWT onto the management information recording area A2, thereby updating the management information VMG.

In addition, consider another case where the user enters a command for starting writing at the operation button switch 23 when having entered a command for enabling the setting of overwriting (enabling overwriting) at the mode selector switch 27. In this case, the control portion 21 first controls the reading system RDC to reproduce the management information VMG recorded on the DVD-RW 2. Then, based on the management information VMG reproduced, the control portion 21 checks for a vacant area in the real-time data recording area A3 in the DVD-RW 2 and a cell of the program data VRO which have been reproduced at least once. Thereafter, the control portion 21 activates the writing system WTC to overwrite the program data VRO, which have been reproduced at least once, by the cell with the compressed video data Dcv and the compressed audio data Dca in the writing data DWT or write the data Dcv and Dca on a vacant area in the real-time data recording area A3. After the overwriting or the writing has been completed, the control portion 21 writes the management data DCNT in the writing data DWT onto the management information recording area A2, thereby updating the management information VMG.

The reading system RDC comprises a read circuit 15, a media decoder 16, an AV decoder 17, a composite signal generator portion 18, and a D/A converter 19.

The read circuit 15 shapes the waveform of a signal (RF signal) DRD read from the DVD-RW 2 by means of the pickup 4 and supplies reproduced data DPP generated by waveform shaping to the media decoder 16.

The media decoder 16 performs decoding processing such as de-interleaving on the reproduced data DPP and then supplies the resulting decoded data DPR to the AV decoder 17.

The AV decoder 17 demultiplexes the decoded data DPR, thereby separating the compressed video data from the compressed audio data, both being included in the decoded data DPR.

In addition, the AV decoder 17 performs decompression processing corresponding to the compression scheme of the aforementioned video compressor circuit 8 and predetermined decompression processing corresponding to the compression scheme of the aforementioned audio compressor circuit 9 on the compressed video data and compressed audio data. The AV decoder 17 thereby generates decompressed video data DRV and audio data DRA to supply the data DRV and DRA to the composite signal generator portion 18 and the D/A converter 19.

Incidentally, although detailed later, user's entry of a command for starting reading at the operation button switch 25 will cause the control portion 21 to control the reading system RDC and reproduce the management information VMG recorded on the DVD-RW 2. Thereafter, the control portion 21 controls the AV decoder 17 based on the management information VMG, thereby performing the aforementioned de-multiplexing and the compression processing to generate the video data DRV and the audio data DRA.

A read working memory 20 is formed of a semiconductor memory and is adapted to store temporarily the individual data of the media decoder 16 and the AV decoder 17 when the media decoder 16 and the AV decoder 17 perform the aforementioned processing. In addition, the management information VMG reproduced is supplied to the control portion 21 via the read working memory 20, whereby the reproduction operation is carried out under the control of the control portion 21. Furthermore, when the writing system WTC performs the aforementioned information recording, the management information VMG reproduced is supplied to the control portion 21 via the read working memory 20, whereby the writing operation is carried out under the control of the control portion 21.

The composite signal generator portion 18 generates a composite signal SVO such as of the NTSC scheme from the video data DRV and the audio data DRA, which are decompressed at the AV decoder 17, and outputs it. The D/A converter 19 converts the audio data DRA decompressed at the AV decoder 17 to an analog audio signal SAO, and outputs it. This makes it possible to supply the composite signal SVO to a television set and thus read and display the video information recorded on the DVD-RW 2. In addition, it is also possible to supply the audio signal SAO to the speaker via an audio amplifier in order to reproduce the audio information recorded on the DVD-RW 2.

Next, the operation of the information read/write system 1 will be explained with reference to the flow charts of FIGS. 6 to 8.

FIG. 6 shows a normal writing operation. What is meant by the normal writing operation is the operation for recording new data on the DVD-RW 2 when the DVD-RW 2 has never been in use and recording has already been carried out but no reading has ever been carried out thereon.

When the user inputs the television signal SANT or the audio/video signal SAVI and then enters a command to start writing by turning on the operation button switch 23, the writing operation is started by the writing system WTC under the control of the control portion 21.

First, in step 100, the reading system RDC is activated to read the management information VMG, shown in FIGS. 3 to 5, from the management information recording area A2 of the DVD-RW 2. Next, in step 102, it is determined whether the management information VMG has been read properly. If an error has been detected, the process is moved to step 126 to perform error processing and display the occurrence of abnormality at a display portion (not shown) provided at the operation portion 22, and then the writing operation is terminated.

If the management information VMG has been properly reproduced, the process is moved to step 104 to detect a vacant area (non-recorded area) in the real-time data recording area A3 based on the management information VMG reproduced.

Next, in step 106, it is determined whether a vacant area is available for recording. If no vacant area is available, the process moves to step 126 to perform the error processing and display the occurrence of abnormality at the display portion (not shown) provided at the operation portion 22, and then the writing operation is terminated.

On the other hand, if an area is available for recording, the process moves to step 108 to identify the position of the vacant area onto which the management information generator circuit 11 is to write the program data VRO. Furthermore, in step 110, data such as the management information indicating the aforementioned position of the vacant area and the time of recording are stored in the write working memory 14. That is, the management data DCNT which is to be recorded as the program chain information PGCI shown in FIG. 5 is generated to be stored in the write working 14.

Next, in step 112, the media encoder 12 generates, through encoding processing, the writing data DWT which will become the program data VRO, which is in turn stored in an encoding buffer assigned within the write working memory 14.

Next, in step 114, the writing data DWT is stored in the encoding buffer by the cell shown in FIG. 2. Thereafter, in step 116, the writing data DWT in the encoding buffer is recorded in the vacant area in the real-time data recording area A3 as the program data VRO by the cell.

Next, in step 118, it is checked whether a command for terminating the writing has be entered at the operation button switch 24. If no command has been entered for terminating the writing, it is so judged that entire writing has not yet been completed and the process is repeated from step 106 to 118.

On the other hand, if a command for terminating the writing has been entered, the process moves to step 120. In step 120, it is determined whether a vacant area is available, in the management information recording area A2, for recording the aforementioned management data DCNT stored in the write working memory 14. If a vacant area is not available in the management information recording area A2, the process moves to step 126 to perform the error processing and display the occurrence of abnormality at the aforementioned display portion provided at the operation portion 22, and then the writing operation is terminated.

If a vacant area is available in the management information recording area A2, the position of the vacant area for recording the aforementioned management data DCNT is detected in step 122. Then, step 124, the management data DCNT is recorded onto the vacant area, and then the writing operation is terminated. That is, by recording the management data DCNT, information associated with each of the items in the object information table VOBI_Table and the program chain information PGCI, shown in FIGS. 4 and 5, is recorded.

Furthermore, consider a case where the user enters a command for starting writing at the operation button switch 23 after having entered a command for disabling the setting of erasing at the protect button switch 28. In this case, flag data indicating "disabling erasing" is recorded in step 124 as the protect information PRTI shown in FIG. 4. In addition, consider another case where the user enters a command for starting writing at the operation button switch 23 after having entered a command for enabling the setting of erasing at the protect button switch 28. In this case, flag data indicating "enabling erasing" is recorded in step 124 as the protect information PRTI shown in FIG. 4.

Next, the reading operation will be explained with reference to FIG. 7. When the user specifies the contents which have been already recorded to enter a command for starting reading at the operation button switch 25, the reading operation is started by the reading system RDC under the control of the control portion 21.

First, in step 200, the management information VMG, shown in FIGS. 3 to 5, is read from the management information recording area A2 of the DVD-RW 2. Next, in step 202, it is determined whether the management information VMG has been read properly. If an error has been detected, the process is moved to step 218 to perform the error processing and display the occurrence of abnormality at the display portion (not shown) provided at the operation portion 22, and then the reading operation is terminated.

If the management information VMG has been properly reproduced, the process is moved to step 204 to determine the order of reading the cells which constitute the program data VRO of the contents specifies by the user. That is, the order of reading the cells is determined, based on each information included in the program chain information PGCI shown in FIG. 5.

Next, in step 206, it is started to read the program data VRO by the cell in accordance with the order of reading which has been determined Next, in step 208, it is determined whether the program data VRO has been properly reproduced by the cell. If an error has occurred, the process moves to step 218 to perform the error processing and display the occurrence of abnormality at the aforementioned display portion provided at the operation portion 22, and then the reading operation is terminated.

On the other hand, if the program data VRO has been properly reproduced by the cell, the media decoder 16 and the AV decoder 17 perform the decoding processing in step 210.

Furthermore, in step 212, the control portion 21 generates the read time data PBT, which is to be recorded in the cell general information CGI shown in FIG. 5, for each of the cells which have been reproduced. Then, the control portion 21 stores the data PBT generated by the cell in the read working memory 20.

Next, in step 214, it is checked whether a command for terminating the reading has been entered at the operation button switch 26. If no command has been entered for terminating the reading, it is so judged that entire reading has not yet been complete and the process is repeated from step 206 to 214.

If a command for terminating the reading has been entered, the process moves to step 216 to record the read time data PBT which is stored in the read working memory 20, by the cell through the writing system WTC. Then, the reading operation is terminated. That is, the reading operation is terminated after the information regarding the read time data PBT in the cell general information CGI shown in FIG. 5 has been updated with new read time data PBT.

Next, referring to FIG. 8, the writing operation will be explained in the cases where the user enters a command for starting writing at the operation button switch 23 after having entered a command for overwriting at the mode selector switch 27 and where the user enters a command for starting writing at the operation button switch 23 after having entered a command for releasing the setting of overwriting at the mode selector switch 27.

User's entry of the television signal SANT or the audio/video signal SAVI to start writing at the operation button switch 23 will cause the writing operation to be started by the writing system WTC under the control of the control portion 21.

First, in step 300, the reading system RDC is activated to read the management information VMG, shown in FIGS. 3 to 5, from the management information recording area A2 of the DVD-RW 2. Next, in step 302, it is determined whether the management information VMG has been read properly. If an error has been detected, the process is moved to step 340 to perform the error processing and display the occurrence of abnormality at the display portion (not shown) provided at this operation portion 22, and then the writing operation is terminated.

If the management information VMG has been reproduced properly, the process moves to step 303 where it is determined whether the setting of overwriting (enabling overwriting) has been made by the mode selector switch 27. If the setting of overwriting has been made (when "Yes" is to be selected), the process moves to step 304.

On the other hand, if the setting of releasing overwriting (disabling overwriting) has been made (when "No" is to be selected), the normal writing operation is carried out in steps 104 to 126 as shown in FIG. 6. That is, if the setting of releasing overwriting (disabling overwriting) has been made by means of the mode selector switch 27, data is recorded on a vacant area (non-recorded area) in the real-time data recording area A3 so as not to overwrite one piece of or a plurality of pieces of program data VRO which have been recorded on the real-time data recording area A3.

Accordingly, consider the case where data is written under the "setting of releasing overwriting (disabling overwriting)" made by means of the mode selector switch 27. In this case, even when the program data VRO exists in which flag data indicating "enabling erasing" has been written as the protect information PRTI, the program data VRO in which the flag data indicating the "enabling erasing" has been written is not to be overwritten.

In step 304, based on the management information VMG reproduced, the program data VRO with the protect information PRTI being made "enabling erasing" is detected, and an area which can be overwritten in the real-time data recording area A3 is also detected from the read time data PBT in the program chain information PGCI. That is, the program data VRO which has been reproduced at least once with the protect information PRTI being made "enabling erasing" is detected as target data which allows overwriting. In addition, an area which allows overwriting is detected by the cell.

Next, in step 306, it is determined whether there exists an area which allows overwriting. If there exists an area which allows overwriting, the process moves to step 308, whereas the process moves to step 320 if there exists no area which allows overwriting.

Incidentally, the process moves to step 320 in the following cases. That is, a first case happens if all pieces of the protect information PRTI of one piece of or a plurality of pieces of program data VRO, which have been already written, are made "disabling erasing". A second Case happens if no more areas which allow overwriting become available in the course of the writing operation during step 306 to 318, as described later, and the writing operation is carried out successively in vacant areas (non-recorded areas) in the real-time data recording area A3. A third case happens if only the program data VRO which is made "enabling erasing" but has not been reproduced even once is written.

In step 308, the management information generator circuit 11 identifies the position of an area which allows overwriting with the program data VRO. In addition, in step 310, data such as the management information data indicating the position of areas which allow overwriting and time of recording are stored in the write working memory 14. That is, the management data DCNT which is to be recorded as the program chain information PGCI shown in FIG. 5 is generated to be stored in the write working memory 14.

Next, in step 312, the media encoder 12 performs the encoding processing to generate he writing data DWT which will become the program data VRO which is in turn stored in the encoding buffer assigned in the write working memory 14.

Next, in step 314, the writing data DWT is accumulated in the encoding buffer for each of the cells shown in FIG. 2. Then, in step 316, the writing data DWT in the encoding buffer is written in the areas which allow overwriting in the real-time date recording area A3 as the program data VRO by the cell.

Here, the read time PBT in the cell general information is checked based on the management information VMG reproduced. The writing data DWT is sequentially written in areas starting from the overwriting enabled area corresponding to the cell which has been reproduced earliest in time (in terms of year, month, day, hour, minute, and second).

Next, in step 318, it is checked whether a command for terminating writing has been entered at the operation button switch 24. If no command has been entered for terminating the writing, it is so judged that entire writing has not yet been completes and the process is repeated from step 306 to 318.

On the other hand, if a command for terminating the writing has been entered, the process moves to step 334. In step 334, it is determined whether a vacant area is available, in the management information recording area A2, for recording the aforementioned management data DCNT stored in the write working memory 14. If a vacant area is not available in the management information recording area A2, the process moves to step 340 to perform the error processing and display the occurrence of abnormality at the aforementioned display portion provided at the operation portion 22, and then the writing operation is terminated.

If a vacant area is available in the management information recording area A2, the position of the vacant area for recording the aforementioned management data DCNT is detected in step 336. Then, in step 338, the management data DCNT is recorded onto the vacant area, and then the writing operation is terminated. That is, by recording the management data DCNT, information associated with each of the items in the object information table VOBI_Table and the program chain information PGCI, shown in FIGS. 4 and 5, is recorded.

Furthermore, consider a case where the user enters a command for starting writing at the operation button switch 23 after having entered a command for disabling the setting of erasing at the protect button switch 28. In this case, flag data indicating "disabling erasing" is recorded in step 338 as the protect information PRTI shown in FIG. 4. In addition, consider another case where the user enters a command for starting writing at the operation button switch 23 after having entered a command for enabling the setting of erasing at the mode selector switch 27. In this case, flag data indicating "enabling erasing" is recorded in step 338 as the protect information PRTI shown in FIG. 4.

In step 320, first it is determined whether a vacant area is available based on the management information VMG reproduced, when the process has moved from the aforementioned step 306 to step 320. If no vacant area is available, the process moves to step 340 to perform the error processing and display the occurrence of abnormality at the display portion (not shown) provided at the operation portion 22, and then the writing operation is terminated.

On the other hand, if an area is available, the process moves to step 322. In step 322, the management information generator circuit 11 identifies the position of a vacant area which allows writing the program data VRO. In addition, in step 324, data such as the management information data indicating the position of vacant areas into which data is to be written and time of recording are stored in the write working memory 14. That is, the management data DCNT which is to be recorded as the program chain information PGCI shown in FIG. 5 is generated to be stored in the write working memory 14.

Next, in step 326, the media encoder 12 performs the encoding processing to generate the writing data DWT which will become the program data VRO, which is in turn stored in the encoding buffer assigned in the write working memory 14.

Next, in step 328, the writing data DWT is accumulated in the encoding buffer for each of the cells shown in FIG. 2. Then, in step 330, the writing data DWT in the encoding buffer is written in the areas which allow overwriting in the real-time data recording area A3 as the program data VRO by the cell.

Next, in step 332, it is checked whether a command for terminating writing has been entered at the operation button switch 24. If no command has been entered for terminating the writing, it is so judged that entire writing has not yet been completed and the process is repeated from step 320 to 332.

If a command for terminating the writing has been entered, the process moves to step 334. Then, in step 334, it is determined whether a vacant area is available, in the management information recording area A2, for recording the aforementioned management data DCNT stored in the write working memory 14. If a vacant area is not available in the management information recording area A2, the process moves to step 340 to perform the error processing and display the occurrence of abnormality at the aforementioned display portion provided at the operation portion 22, and then the writing operation is terminated.

If a vacant area is available in the management information recording area A2, the position of the vacant area for recording the aforementioned management data DCNT is detected in step 336. Then, in step 338, the management data DCNT is recorded onto the vacant area, and then the writing operation is terminated. That is, by recording the management data DCNT, information associated with each of the items in the object information table VOBI_Table and the program chain information PGCI shown in FIGS. 4 and 5, is recorded.

Furthermore, consider a case where the user enters a command for starting writing at the operation button switch 23 after having entered a command for disabling the setting of erasing at the protect button switch 28. In this case, flag data indicating "disabling erasing" is recorded in step 338 as the protect information PRTI shown in FIG. 4. In addition, consider another case where the user enters a command for starting writing at the operation button switch 23 after having entered a command for enabling the setting of erasing at the mode selector switch 27. In this case, flag data indicating "enabling erasing" is recorded in step 338 as the protect information PRTI shown in FIG. 4.

Take a case where the read the data PBT of the program data VRO which has been reproduced at least once has been written in the management information recording area A2 of the DVD-RW 2 and new data is written therein. In this case, according to this embodiment as described above, the read time data PBT is checked to allow overwriting older program data VRO with the new data. This liberates the user from such complicated operation as to check for the program data VRO which allows overwriting and then specify an area which allows overwriting to start writing.

In addition, new data is adapted to overwrite older program data VRO in sequence, thereby providing improved convenience for the user.

Furthermore, the information of the read time data PBT is recorded by the cell and overwriting is carried out by the cell, thereby eliminating such a problem as unnecessary data remains unerased in the real-time data recording area A3. Consequently, this allows the program data VRO to be recorded efficiently in the real-time data recording area A3.

In addition, consider another case where the protect information PRTI indicating either "disabling erasing" or "enabling erasing" is recorded by the program data VRO (every object VOB). In the case that the protect information PRTI is made "disabling erasing", the new data is adapted not to overwrite the program data VRO of the corresponding cell, thereby making it possible to prevent such a problem as to erase accidentally the program data VRO which is desired to remain unerased.

Consider another case where the mode selector switch 27 is provided, on the side of the information read/write system 1, for selectively specifying either the setting of overwriting (enabling overwriting) or the setting of releasing overwriting (disabling overwriting), and the user specifies the setting of overwriting (enabling overwriting). Only in this case, overwriting is adapted to be carried out on condition that the aforementioned protect information PRTI has been made "enabling erasing". This makes it possible to prevent such a problem as to erase accidentally the program data VRO which is desired to remain unerased.

Incidentally, in this embodiment, the overwriting is adapted to be carried out by the cell, however, it may be done by the object VOB. However, since overwriting by the object VOB would cause unnecessary data to remain unerased, overwriting is preferably carried out by the cell.

In addition, overwriting may be carried out by the audio pack data A or the video pack data V. Overwriting as such will make it possible to write the program data VRO more efficiently into the real-time data recording area A3 than the overwriting by the cell. However, overwriting by the cell will sufficiently meet the practical use.

While there has been describe what are at present considered to be preferred embodiments of the invention, it will be understood that various modifications may be made thereto, and it is intended that the appended claims cover all such modifications as fall with in the true spirit and scope of the invention.

What is claimed is:

1. An information recording medium for allowing an information read/write system to write, read, and rewrite information thereon, comprising:

a recording area for allowing program information to be recorded thereon; and a management information recording area for allowing management information to be recorded thereon for managing the program information recorded on said recording area; wherein, when said information read/write system reproduces one piece of or a plurality of pieces of the program information having already been recorded in said recording area, history management information indicating that the program information has been reproduced is recorded in the management information recording area, corresponding to said one piece of or said plurality of pieces of the program information, and when said information read/write system records other program information, said other program information overwrites the program information having been already recorded corresponding to said history management information.

2. The information recording medium according to claim 1, wherein said history management information is time information indicating time of reproduction.

3. The information recording medium according to claim 1, wherein when said information read/write system records the other program information, said other program information is allowed to overwrite the program information having been already recorded, and reproduced at the earliest time, corresponding to said history management information.

4. The information recording medium according to claim 1, wherein said information read/write system records protect management information indicating a setting of disabling erasing of said program information in said management information recording area, and when said information read/write system records the other program information, said other program information is not allowed to overwrite the program information corresponding to the protect management information indicating said setting of disabling erasing.

5. An information read/write method for writing, reading, and re-writing information on an information recording medium allowing writing, reading, and re-writing information thereon, comprising the steps of:

recording history management information indicating that one piece of or a plurality of pieces of program information has been reproduced in a predetermined management information recording area of the information recording medium, corresponding to said one piece of or said plurality of pieces of the program information when said program information having already been recorded is reproduced, and overwriting other program information on the program information having been already recorded, corresponding to said history management information when said other program information is recorded.

6. The information read/write method according to claim 5, wherein said history management information is time information indicating time of reproduction.

7. The information read/write method according to claim 5, wherein when said other program information is recorded, said other program information is allowed to overwrite the program information having been already recorded, and reproduced at the earliest time, corresponding to said history management information.

8. The information read/write method according to claim 5, further comprising a step of recording protect management information indicating a setting of disabling erasing of said program information in said management information recording area, wherein when said other program information is recorded, said other program information is not allowed to overwrite the program information corresponding to said protect management information indicating said setting of disabling erasing.

9. An information read/write system for writing, reading, and re-writing information on an information recording medium allowing writing, reading, and re-writing information thereon, comprising:

means for recording history management information indicating that one piece of or a plurality of pieces of program information has been reproduced in a predetermined management information recording area of the information recording medium, corresponding to said one piece of or said plurality of pieces of the program information when said program information having already been recorded is reproduced, and means for overwriting other program information on the program information having been already recorded, corresponding to said history management information when said other program information is recorded.

10. The information read/write system according to claim 9, wherein said history management information is time information indicating time of reproduction.

11. The information read/write system according to claim 9, wherein when said other program information is recorded, said other program information is allowed to overwrite the program information having been already recorded, and reproduced at the earliest time, corresponding to said history management information.

12. The information read/write system according to claim 9, wherein protect management information indicating a setting of disabling erasing of said program information is recorded in said management information recording area, and when said other program information is recorded, said other program information is not allowed to overwrite the program information corresponding to the protect management information indicating said setting of disabling erasing.

* * * * *